June 15, 1926.
J. F. NOVAK
BAKER S OVEN
Filed Dec. 24, 1925
1,588,983
3 Sheets-Sheet 3
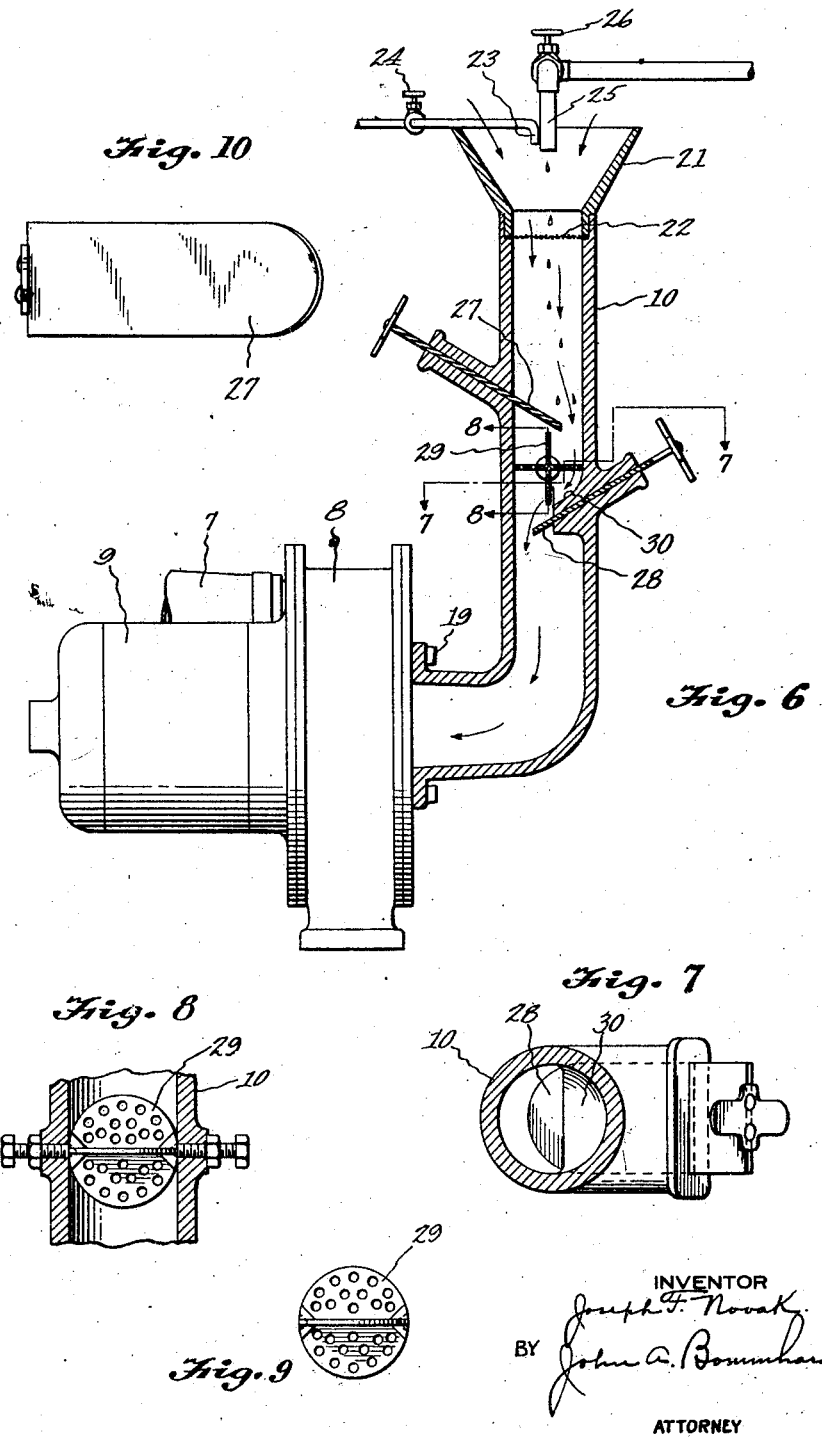

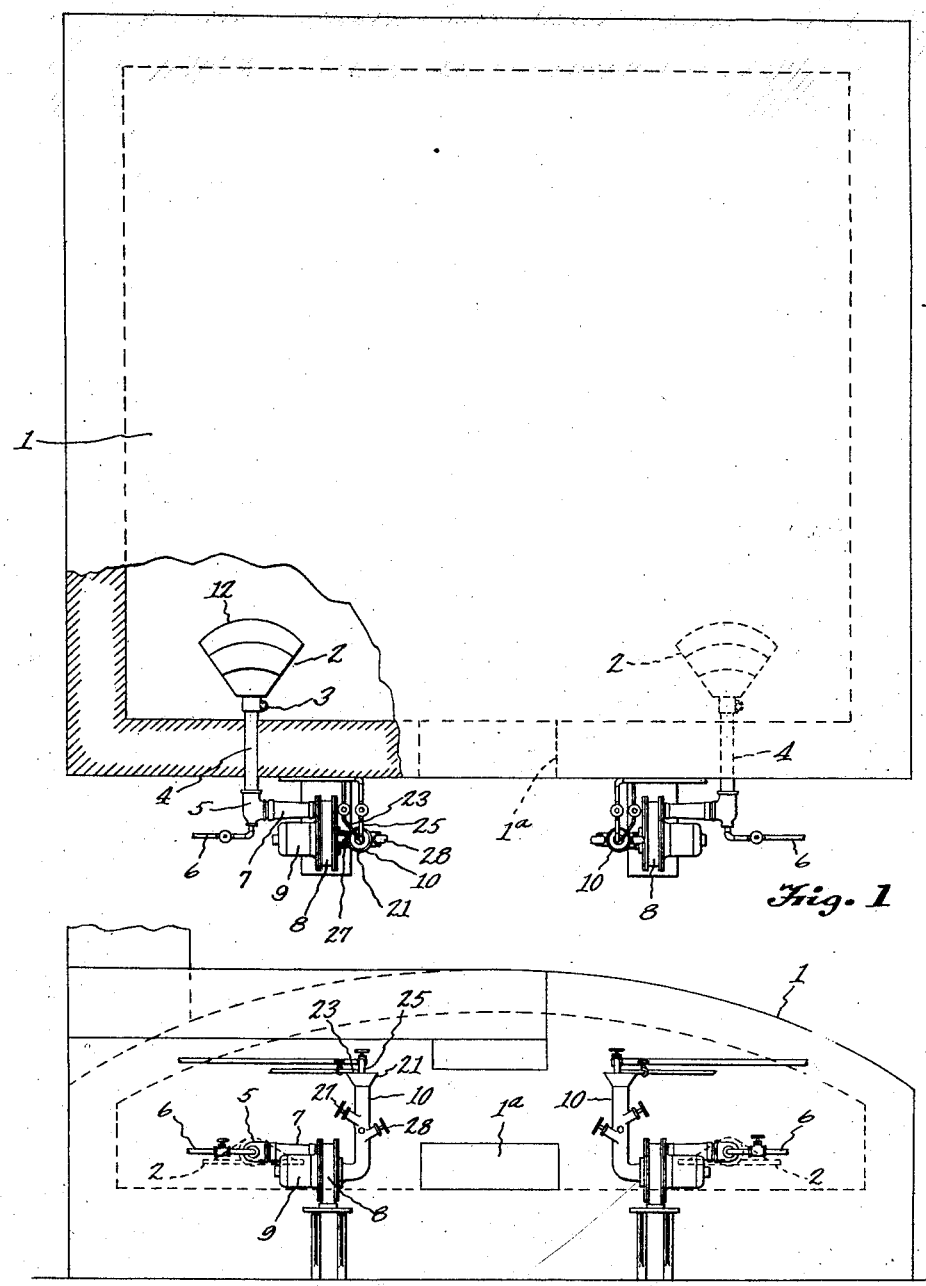

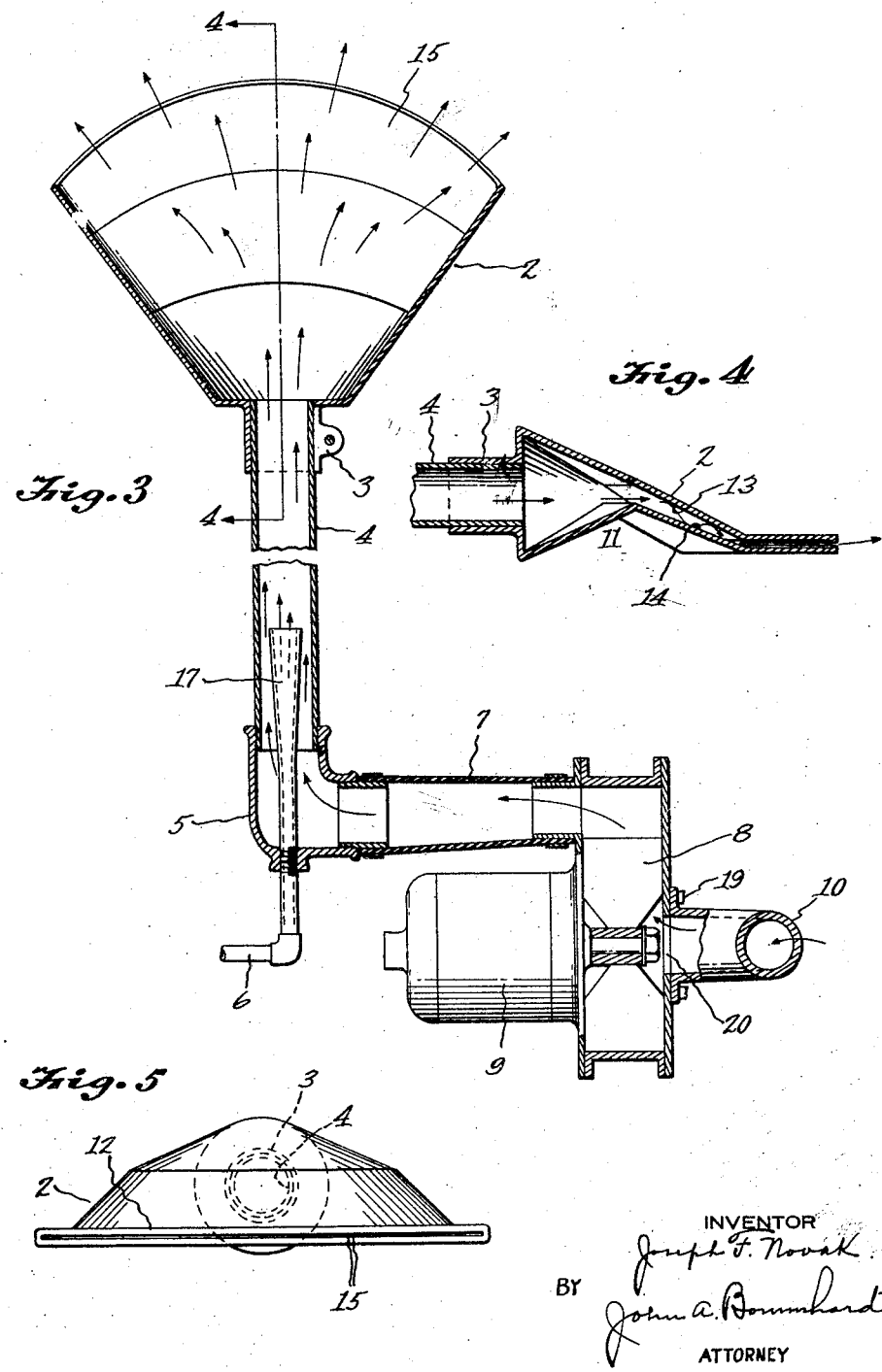

Patented June 15, 1926.

1,588,983

UNITED STATES PATENT OFFICE.

JOSEPH F. NOVAK, OF CLEVELAND, OHIO.

BAKER'S OVEN.

Application filed December 24, 1925. Serial No. 77,560.

This invention relates to bakers' ovens, and has for its object the provision of means for supplying heat and moisture into the same. The dry heat of the present gas-heated baking ovens tends to produce bread loaves, cakes and the like completely dried out, with cracked skins and an undesirable flavor. The object of my invention is to introduce moisture into the gas heating means, whereby the proper humidity may be maintained in the oven. The old wood-burning ovens formerly produced bread and the like with the desirable amount of moisture and without impairing the flavor thereof, due to the fact that the moisture of the wood burned was partly absorbed by the baking bread or the like. The gas ovens which have replaced the old wood-burning ovens include no efficient means for the introduction of moisture, and it is the object of my invention to provide such means.

Another object of my invention is to provide fuel enriching means, whereby, should the gas pressure become low, the heat supplied to the oven will not be materially diminished.

My invention is illustrated in the accompanying drawings, in which Fig. 1 is a plan view of a bread baking oven with heating and moisture producing means applied thereto, Fig. 2 is a front elevation thereof, Fig. 3 is a detail sectional view of one of the burners, Fig. 4 is a section on the line 4—4 of Fig. 3, Fig. 5 is an end view thereof, Fig. 6 is a detail sectional view of the mixing manifold, Fig. 7 is a section on the line 7—7 of Fig. 6, Figs. 8 and 9 are detail views of the vaporizer, and Fig. 10 is a view of one of the gate valves.

Referring specifically to the drawings, 1 indicates a gas-heated oven of usual construction, on each side of the door 1ª thereof I provide a burner unit consisting of a burner 2 mounted by means of a bolted split collar 3 on a supply pipe 4 projecting thru the front wall of the oven and connecting at a T-joint 5 with a gas supply pipe 6 and a heat and vibration insulating tube 7 connecting with an air blower 8 driven by an electric motor 9. The blower intake is provided with a mixing manifold 10 to be hereinafter described.

The location and number of burners is of course to be determined by the size of the oven to be heated. These burners, illustrated in Figs. 3, 4, and 5, comprise a substantially fan-shaped body. The burner has a slightly bowed top, clearly shown in Fig. 5, and a recess generally indicated at 11 in the bottom thereof. A mixture of air, water vapor and kerosene or the like is blown thru pipe 7, as will be presently explained, and this mixture joins gas issuing from gas supply pipe 17. The gas and the mixture are then blown thru pipe 4 into the burner, and impinge against the interior surfaces 13 and 14 thereof, are thoroly mixed and spread and the force thereof reduced, simultaneously. The mixed gas and mixture then issue from the lips 15 of mouth 12, where it is ignited and burns in the form of a yellow fan-like flame.

To produce the mixture of water vapor, air and kerosene or the like, which is blown in by blower 8 to burner 2, I provide a mixer illustrated in Fig. 6, wherein 10 indicates generally the body thereof, which is bolted at 19 to the intake 20 (Fig. 3) of blower 8. At the top of this mixing manifold, I provide a removable member 21 in the form of a funnel. A screen 22, of any desired mesh, is held between the bottom of funnel 21 and a circumferential groove in the manifold 10. This screen serve to prevent dirt or other foreign matter from dropping into the manifold, and also to assist in breaking up drops of water and kerosene dropped from pipes 23 and 25 respectively. The amount of water and kerosene dropped may be controlled by the respective valves 24 and 26, and may come from any suitable supply, not shown. The kerosene may be supplied only when the gas pressure has become low and it is desired to enrich the fuel.

Adjustable gate valves or baffles 27 and 28 are angularly disposed in the intake manifold and are located on either side of a vaporizer 29. The vaporizer is made of two circular perforated discs, joined together at right angles, as shown. At the point of location of gate valves 28, I provide an inward extension or baffle 30. In the operation of the mixer, the blower tends to create a vacuum in the manifold, which results in the suction of air and broken drops of water and kerosene thru screen 22, downwardly between gate valves 27 and 28, which are so arranged that the moisture laden air current is directed by the same and the baffle 30 against the side of the vaporizer, thereby producing rapid revolution of the vaporizer and consequent breaking up of the particles of water and kerosene into vapor.

From the foregoing description, it will be seen that the burners are provided with a mixture of water, vapor, air and gas, and if desired, kerosene or the like, whereby the burners will produce both heat and moisture.

My invention is not limited to the particular form shown, but various modifications thereof are within the scope of the following claims.

I claim:

1. Means for supplying fuel, air and water vapor or the like to a burner, comprising a water and air supply, a water vaporizer and an air and water vapor mixing manifold, a gas supply pipe connected to the burner, and a blower operatively arranged between said manifold and gas supply pipe, whereby air and water are drawn into said manifold, the water vaporized and mixed with said air and blown into said gas supply pipe and thence with gas from said pipe to the burner.

2. The combination with a gas supply pipe to a burner, of means for supplying air and water vapor or the like thereto comprising a water and air supply, an intake manifold, baffles in said manifold, a vaporizer in said manifold, and a blower operatively arranged between said manifold and gas supply pipe, whereby air and water is drawn into said manifold, the water vaporized, mixed with said air and forced into said gas supply pipe.

3. The combination with a gas supply pipe to a burner, of means for supplying air and water vapor or the like thereto comprising a water and air supply, an intake manifold, baffles in said manifold, a vaporizer in said manifold, and a blower operatively arranged between said manifold and gas supply pipe, whereby air and water is drawn into said manifold, the water vaporized, mixed with said air and forced into said gas supply pipe, said baffles comprising two adjustable gate valves, whereby the amount of water vapor and air supplied to said gas supply pipe may be varied.

4. The combination with a gas supply pipe to a burner, of means for supplying air and water vapor or the like thereto comprising a water and air supply, an intake manifold, baffles in said manifold, a vaporizer in said manifold, and a blower operatively arranged between said manifold and gas supply pipe, whereby air and water is drawn into said manifold, the water vaporized, mixed with said air and forced into said gas supply pipe, said vaporizer comprising two circular perforated discs joined together at right angles and rotatably mounted in said manifold adjacent said baffles and adapted to be revolved by the passage of air between said baffles.

In testimony whereof, I do affix my signature.

JOSEPH F. NOVAK.